April 10, 1956 D. L. SPENCER 2,741,263
HYDRAULIC CONTROL APPARATUS
Filed May 21, 1952
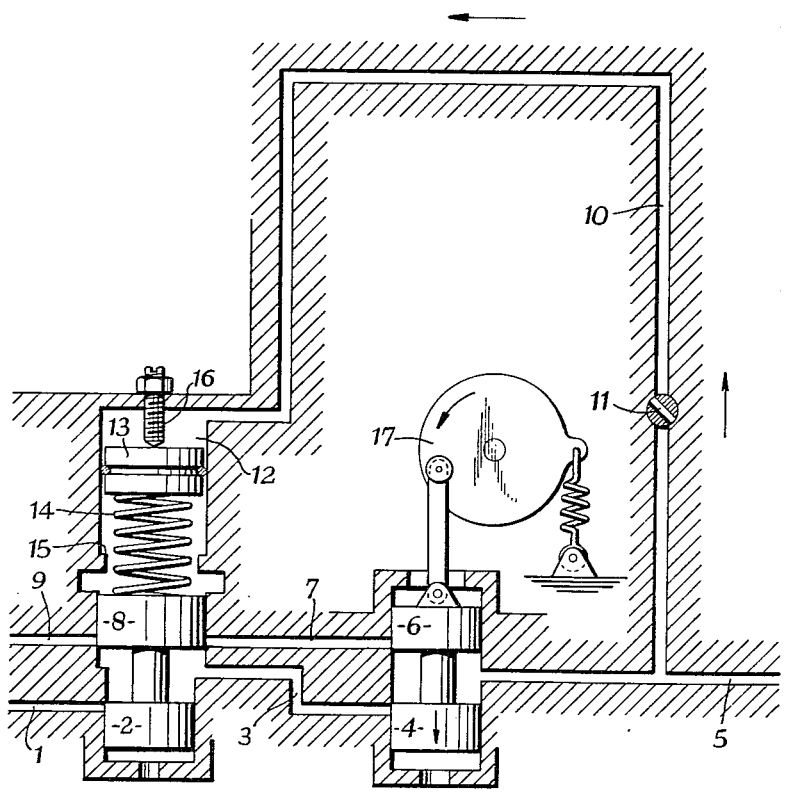
INVENTOR
DENNIS L. SPENCER
BY
Herbert H. Thompson
his ATTORNEY

UNITED STATES PATENT OFFICE 2,741,263
Patented Apr. 10, 1956

2,741,263

HYDRAULIC CONTROL APPARATUS

Dennis Lincoln Spencer, West Twyford, London, England, assignor, by mesne assignments, to The Sperry Gyroscope Company, Limited, Brentford, England, a British company Application May 21, 1952, Serial No. 289,102

Claims priority, application Great Britain May 24, 1951

11 Claims. (Cl. 137—505.14)

The present invention relates to hydraulic installations for supplying fluid at an operating pressure to hydraulic utilization apparatus such as a reversible hydraulic motor used as the servo-motor of an automatic control system or servo mechanism, and, in particular, to pressure-regulating apparatus of the kind for passing pressure-fluid from a source to utilization apparatus and including a pressure-regulating valve having a variable throttling constriction between its inlet and its outlet, the outlet being adapted to be connected to the utilization apparatus to serve as the source of pressure-fluid for that apparatus, so that, if the valve is moved to open the throttling constriction, the output pressure applied to the utilization apparatus rises, while, if the valve is moved to close the throttling constriction, the output pressure applied to the utilization apparatus falls. In order to serve as pressure-regulating devices such valves are arranged to be subjected to a thrust that is applied to the movable element of the valve in dependence on the pressure in the valve outlet and that acts degeneratively to close the valve, and also to be subjected to a counteracting biassing force, e. g., one applied by a spring, that resists this self-closing action and which either acts always on the valve element or exerts a force that comes into operation when the valve is moved beyond a threshold position in the closing direction. Pressure-regulating apparatus including a valve so arranged is termed in this specification "pressure-regulating apparatus of the kind specified."

The object of the invention is to provide pressure-regulating apparatus of the kind described above, arranged to ensure that, when the utilization apparatus is rendered operative, the operating pressure of the pressure-fluid supplied to it is initially low and builds up slowly to a value that is substantially independent of the rate at which the utilization apparatus draws fluid from the supply source.

For this purpose there is provided, according to the invention, pressure-regulating apparatus of the kind specified, including means for subjecting the valve to an additional thrust operating in a direction that tends to open the valve and thus increase the output pressure, i. e., operating regeneratively, which additional thrust is dependent on the output pressure of the valve.

According to the invention, pressure-regulating apparatus for passing pressure-fluid from a source to utilization apparatus includes a pressure-regulating valve having a variable throttling constriction between its inlet and its outlet, in which a thrust is applied to the movable element of the valve in dependence on the pressure in or near the valve outlet in the sense to close the valve, and a counteracting biasing force is also applied to the movable element in the sense resisting the self-closing action, characterized by a pressure chamber, the pressure in which follows changes in the pressure in or near the valve outlet after an appreciable time delay, and which is used to provide an additional thrust to the movable element of the valve in the sense tending to open the valve.

It follows that the regulating valve is subjected to two opposed thrusts dependent on the output pressure; the closing thrust rapidly responsive to output pressure which may be achieved by means of a 2:1 piston valve, the space between the ends of the piston being subject to the output pressure, as is well understood in the art; and an opening thrust slowly responsive to the output pressure. A piston in the chamber is movable in response to changes of pressure in the chamber and transmits the additional thrust by way of a spring to the movable element of the valve.

In order that the invention may be clearly understood and readily carried into practice, there will now be described a preferred embodiment thereof by way of example with reference to the accompanying drawing in which the single figure is a diagram of a preferred pressure-regulating apparatus in which the various valves are piston valves.

Referring to the drawing, pressure-fluid is to be supplied from a source (not shown) by way of an inlet channel 1, a pressure-regulating piston valve 2, channel 3, cut-off valve 4 and outlet channel 5 to utilization apparatus (not shown). The cut-off valve forms one end land of a generally dumb-bell shaped valve element having for its other end a piston valve 6 which is arranged, when the valve 4 is closed, to connect the outlet channel 5 by way of channel 7 and piston valve 8 to exhaust channel 9.

The pistons of valves 2 and 8 are of different cross-sectional areas and are mounted on a common shaft so that pressure in the channel 3 produces a net thrust tending to close the pressure-regulating valve 2.

A feed-back channel 10 leads from the outlet channel 5 by way of a variable restrictor 11 to a chamber 12 in which a piston 13 is movable against a restraint due to a helical spring 14 positioned between the piston 13 and the surface of the piston of valve 8. Movement of the piston 13 is limited in the direction to compress the spring 14 by means of stops 15, and in the other direction by an adjustable screw 16.

The tendency of the valves 2 and 8 to close and open respectively, due to pressure in the channel 3 is opposed by the spring 14 which, in the absence of pressure fluid in the chamber 12, is extended so that the piston 13 is in contact with the screw 16. The pressure-regulating apparatus is switched on by operating the cut-off valve 4 in a direction to open channel 3 to outlet channel 5, and is switched off by operating the valve in a direction to cut-off the communication between said channels. Any suitable means under the control of an operator may be connected to move the dumb-bell element of which valve 4 is a part, whereby the operator is enabled to switch the apparatus on and off, as desired. For purposes of illustration, I have shown, in a general fashion, a variable torque clutch 17 of the rotatable type connected by suitable linkage to position the dumb-bell element in accordance with the direction in which the clutch is rotated by an operator, such as the pilot of an aircraft wherein the apparatus is employed.

In operation, when the system is switched on by opening of the valve 4, fluid will flow through the inlet channel 1 by way of the regulating valve 2, which will be open by virtue of the unopposed thrust of the spring 14, to channel 3, cut-off valve 4 and outlet channel 5. The presence of pressure-fluid in the chamber between the valves 2 and 8 produces a thrust tending to close the valve 2 by virtue of the greater area of the piston of valve 8. This thrust is opposed by the spring 14 acting on the other side of the piston of valve 8 and bearing against the piston 13 which rests against the screw 16. Thus pressure builds up in the channels 3 and 5 to a value that is determined by the pressure drop in the regulating valve 2. Fluid at this pressure is led by way of feedback channel 10 to the chamber 12 but in dependence on the setting of the restrictor 11 and the volume of the chamber 12 the pressure builds up in the chamber 12 slowly. The rate of build up may be determined by choosing the appropriate setting of the restrictor 11. As the pressure builds up in the chamber 12, the piston 13 is forced towards the valves 2 and 8 and compresses the spring 14 which transmits thrust to the piston of valve 8 and as this thrust increases with compression of the spring 14 due to increasing pressure in the chamber 12, the valve 2 moves to open further the pressure-regulating valve. Thus the pressure in the chanels 3 and 5 builds up due to the decreased pressure drop in the regulating valve 2 and the further increase is gradually built up in the chamber 12 so that the regulating valve 2 is further opened.

After a period of time, the duration of which depends on the volume of chamber 12 and the setting or restrictor 11, the pressure gradually built up in chamber 12 causes the slowly moving piston 13 to abut stops 15, whereupon any further pressure build-up in the chamber is ineffective to increase further the compression of spring 14 (hence the additional thrust given to valve 2). As this condition is reached, the partial opening of valve 2 concurrently reaches a stable extent at which the fluid force tending to close valve 2 balances the oppositely-directed spring force or thrust tending to open the same.

In other words, the effect that is produced by the present invention is the same that would be produced in the absence of pressure feed-back if screw 16 were long enough, and it were gradually turned until piston 13 abutted stops 15. So turning the screw would gradually increase the compression of spring 14 to a maximum value just as the slow bleeding of outlet pressure into chamber 12 accomplishes this operation in the present invention. In each case, the initial outlet pressure depends on the initial compression of spring 14 due to the setting of screw 16, while the final or stable outlet pressure depends on the final or maximum compression of spring 14 as determined by the stops 15.

Thus it will be seen that on opening the cut-off valve 4 to switch the system on, the build up of pressure in the outlet cheannel 5 will be slow and the output pressure will not reach its full value until piston 13 abuts stops 15.

When it is desired to shut the system off, the clutch 17 is operated to close the cut-off valve 4 and open the exhaust valve 6 to connect the outlet channel 5 to the channel 7. Reduction of pressure in the outlet channel 5 allows the pressure in the chamber 12 to decrease slowly by way of the restrictor 11 so that the valve 8 under the influence of pressure in channel 3 opens while valve 2 closes as the spring thrust 14 is reduced. The opening of valve 8 serves to connect the channel 7 to the exhaust channel 9, by way of which the fluid leaves the system which is returned to its initial state.

The invention has particular advantages when applied in a hydraulic supply installation for supplying pressure-fluid to the servo-motor control arrangements of a hydraulic automatic control system for controlling the direction of flight, or the attitude of an aircraft, since it ensures that, immediately after switching on, the automatic control system operates with only low pressure-fluid supplied to the servo motors, so that only relatively weak control actions are exercised. The use of the invention therefore affords the pilot time to observe the functioning of the automatic pilot at servo loads for a period in which he can still override the automatic control system by manual control. Furthermore, the invention enables the automatic pilot to be engaged to take over control in a smooth and gradual manner should there be initially some small difference between the attitude of the aircraft and the attitude set for it on the pick-off controllers at the control instruments of the automatic control system.

I claim:

1. In a fluid pressure device having an inlet conduit and an outlet conduit, the combination comprising means including a cylindrical chamber having two bore sections of different cross-sectional areas, a generally dumb-bell shaped piston member slidable in said chamber such that the piston ends of said member slidably engage the respective bore sections, the piston end of lesser diameter being arranged to serve as a valve for controlling communication between said conduits through the portion of said chamber intermediate the piston ends of said member, said outlet conduit being in continuous communication with said intermediate portion, resilient means connected to said member for producing a force thereon urging the same in the direction to open the valve thereby to admit fluid into said intermediate portion of the chamber, the pressure of said fluid against the piston ends of different diameter subjecting said member to a counter-force urging the same in the direction to close the valve, the net effect of said force and counter-force being such that said valve is maintained partially open, means responsive to outlet conduit pressure and connected to said resilient means for actuating the same to open said valve further, and adjustable delay means for selectively delaying the response of said last-recited means whereby the further opening of said valve may be effected gradually.

2. In a fluid pressure device having an inlet conduit and an outlet conduit communicating with a cylindrical chamber, said chamber comprising two bore sections of different cross-sectional areas in one end portion thereof, a generally dumb-bell shaped first piston member slidable in said chamber such that the piston ends of said member slidably engage the respective bore sections, the piston end of lesser surface being arranged in relation to said inlet conduit to open and close the same to said outlet conduit through the portion of said chamber intermediate said piston ends depending on the direction of movement of said member, said outlet conduit being at all times in communication with said intermediate chamber portion, a second piston member slidable in said chamber in the other end portion thereof, a spring, said spring being mounted under compression for resiliently spacing said first and second members apart so that they are respectively caused to abut opposite ends of said chamber, whereby to admit pressure-fluid into said intermediate chamber portion for moving said first member in the direction to close said inlet conduit due to fluid pressure on its greater piston end, and means for gradually introducing the pressure of fluid in the outlet conduit to the abutting surface of said second member whereby the compression of said spring is gradually increased to move said first member in the direction to open said inlet conduit.

3. A pressure regulator of the character described comprising a casing having a cavity therein, an inlet port normally communicating with said cavity for passing fluid thereinto, a first piston-like element adapted slidably to move in said cavity, said first element comprising a first land portion disposed in cooperative relation with said inlet port for opening and closing the same depending on the direction of movement of said first element, a second land portion connected to said first land portion and spaced therefrom so as to form a chamber therebetween, an outlet port communicating with said chamber, the inner face of said second land portion adjacent said chamber being of greater area than the corresponding face of said first land portion whereby the pressure of fluid in said chamber tends to move said first piston-like element to close said inlet port, a second piston-like element adapted slidably to move in said cavity substantially coaxially with said first piston-like element, resilient means interposed between said first element and one end-face of said second element and adapted to urge the former to move in the direction to open said inlet port, and fluid conduit means connecting said outlet port in communication with the other end-face of said second element such that the pressure of outlet fluid tends to move said second element in the direction said first element is urged by said resilient means, whereby the resilient force urging the first element to move for opening said inlet port is increased as a function of outlet pressure.

4. The regulator of claim 3 wherein said fluid conduit means includes an adjustable constrictor for selectively delaying the build-up of full outlet pressure on the other end-face of the second element.

5. Pressure-regulating apparatus comprising a body portion having a bore therein comprising portions of different diameters, said bore including both an inlet port and an outlet port in communication with said bore, a valve element movable in said body portion and including two spaced and rigidly connected land portions of different cross-sectional areas slidably disposed in zones of said bore having corresponding diameters, the smaller of said land portions being arranged to cooperate with said inlet port to control fluid flow into said bore between said land portions, said outlet port being arranged relative to said bore so as continuously to communicate with the space therein between said land portions, the pressure of the fluid between said land portions producing a net force against the larger of said land portions for urging said element in a cut-off direction, pressure-responsive resilient means coupled to said valve element for imparting a counterforce to said element urging the same in an inlet-opening direction, and conduit means connecting said outlet port in communication with said last-recited means whereby said counterforce is increased as a function of outlet pressure.

6. Pressure-regulating apparatus as claimed in claim 5 wherein the pressure-responsive resilient means includes a piston-like member slidably disposed in the bore, and a spring interposed as a coupling between the valve element and one surface of said piston-like member, the other surface being in communication with the outlet port by way of the conduit means.

7. The apparatus of claim 6 further including means for limiting the travel of the piston-like member so that the increase in the counterforce imparted to the valve element is prevented from exceeding a preselected value.

8. A pressure-regulating device for passing pressure-fluid from a source to utilization apparatus, said device comprising a pressure-regulating valve having an inlet and an outlet and including a movable element to which a first thrust is imparted in dependence upon the outlet pressure of said valve for closing said inlet, resilient means connected to said movable element for imparting thereto a second thrust in opposition to said first thrust, means actuated by said outlet pressure for increasing said second thrust, means for limiting the increase of said second thrust a predetermined amount, and settable means for adjusting the rate of increase of said second thrust.

9. A pressure-regulating device for passing pressure-fluid from a source to utilization apparatus, said device comprising a pressure-regulating valve having an inlet and an outlet and including a movable element to which a first thrust is imparted in dependence upon the outlet pressure of said valve for closing said inlet, resilient means connected to said movable element for imparting thereto a second thrust in opposition to said first thrust, said second thrust being of a magnitude that may be balanced by said first thrust when the inlet is partially open, and means coupled to said resilient means and responsive to outlet pressure for continuously increasing said second thrust to a maximum magnitude that may be balanced by said first thrust when the inlet is partially open further.

10. A pressure-regulating device for passing pressure-fluid from a source to utilization apparatus, said device comprising a casing having a cavity therein, an inlet port normally communicating with said cavity for passing fluid thereinto, a first piston-like element adapted slidably to move in said cavity, said first element comprising a first land portion disposed in cooperative relation with said inlet port for opening and closing the same depending on the direction of movement of said first element, a second land portion connected to said first land portion and spaced therefrom so as to form a chamber therebetween, an outlet port communicating with said chamber, the inner face of said second land portion adjacent said chamber being of greater area than the corresponding face of said first land portion whereby the pressure of fluid in said chamber urges said first element to close said inlet port, a second piston-like element adapted slidably to move in said cavity substantially coaxially with said first element, resilient means interposed between said first element and one end-face of said second element and adapted to urge the former to move in the direction to open said inlet port, fluid conduit means connecting said outlet port in communication with the other end-face of said second element so that the pressure of outlet fluid urges said second element to move in a direction to increase the resilient force urging the first element to move for opening said inlet port, and means for limiting the pressure-induced movement of said second element in said direction so as to limit said resilient inlet-opening force to a value that may be balanced by the inlet-closing force produced in said chamber at less than a full opening of said inlet port.

11. The pressure-regulating device of claim 10 wherein said fluid conduit means includes an adjustable constriction for selectively delaying the build-up of full outlet pressure on the other end-face of the second element.

References Cited in the file of this patent

UNITED STATES PATENTS

| | | |
|---|---|---|
| 500,145 | Lucas | June 27, 1893 |
| 1,304,162 | De Schamps | May 20, 1919 |
| 1,701,865 | Soderberg | Feb. 12, 1929 |
| 1,976,820 | Wettstein | Oct. 16, 1934 |
| 2,563,889 | Tuttle | Aug. 14, 1951 |